Jan. 23, 1962 R. H. GUAY 3,017,836
ROCKET MOTOR

Filed Aug. 28, 1958 3 Sheets-Sheet 1

INVENTOR.
R. H. GUAY
BY Hudson and Young
ATTORNEYS

Jan. 23, 1962 R. H. GUAY 3,017,836
ROCKET MOTOR
Filed Aug. 28, 1958 3 Sheets-Sheet 2

INVENTOR.
R.H. GUAY
BY Hudson and Young
ATTORNEYS

Jan. 23, 1962 R. H. GUAY 3,017,836
ROCKET MOTOR
Filed Aug. 28, 1958 3 Sheets-Sheet 3

INVENTOR.
R. H. GUAY
BY Hudson and Young
ATTORNEYS

United States Patent Office 3,017,836
Patented Jan. 23, 1962

3,017,836
ROCKET MOTOR
Roland H. Guay, Waco, Tex., assignor to Phillips Petroleum Company, a corporation of Delaware
Filed Aug. 28, 1958, Ser. No. 757,879
9 Claims. (Cl. 102—49)

This invention relates to rocket motors. In one aspect, this invention relates to a disposable rocket motor. In another aspect, this invention relates to rocket motors fabricated of propellant material.

Large missiles are usually composed of two or more power plants. One of said power plants is generally referred to as the booster unit and the others are referred to as second stage, third stage, etc., or sustainers. The booster is required to provide a high initial thrust to accelerate the missile from take-off to a very high velocity in a short period of time. Prior art shows that detachable rocket booster units have generally been used because there has been little justification for carrying along the weight of a spent booster unit after launching has been accomplished. As soon as the booster burns out, it is automatically detached to reduce the flight weight of the missile. Solid propellant systems as well as liquid propellant systems are used in both the booster and sustainer stage motors. Solid propellant systems are frequently more advantageous than liquid propellant systems. The present invention relates to rocket motors using a solid propellant as the source of power.

In present rocket motor applications employing solid propellants it is customary to employ an expensive metal case or housing. Said case or housing forms the combustion chamber of the motor. In most instances an exhaust nozzle is attached to the rearward end of the case or housing. A solid propellant material is placed within the case and upon burning, produces large volumes of gases under relatively high pressure which are exhausted from the combustion chamber through the nozzle at high velocity, and the reaction resulting from the flow of the gas masses through said nozzle creates the propulsive thrust. Said case or housing must have sufficient strength to withstand the loads imposed on it and at the same time must be as light as possible. Elimination of the metal case would reduce the weight of the rocket motor by a considerable amount and thus improve the overall performance of the rocket.

As mentioned above, in booster rocket applications the metal case or housing is jettisoned when the booster propellant has been consumed. This jettisoning is accompanied with several disadvantages. One major disadvantage is that the heavy case can fall in thickly populated areas and possibly cause considerable loss of life and/or damage to property. Another disadvantage is that the launching equipment and personnel must be kept out of the expected impact area or else protected with heavy concrete bunkers. In wartime conditions, the case can fall into the hands of the enemy.

The above difficulties can be overcome to a great extent by fabricating the rocket motor largely of propellant material and/or other materials which are consumed in flight and/or, as discussed further hereinafter, disintegrates when the web has decreased to a predetermined thickness. Any relatively small parts of the motor which remain unburned after such disintegration will burn before striking the earth or if not burned will cause less damage than the heavy cases customarily used. Thus, broadly speaking, my invention comprises a rocket motor fabricated largely from propellant material and/or other materials which are consumed in flight.

There are other advantages, performance wise, of a rocket motor fabricated from propellant material, i.e., a "caseless" rocket motor, which are more important than the advantages of eliminating "fall-out" of the booster case. This is shown by a consideration of the following factors:

$$V_B = I_{sp} \ln \frac{M_i}{M_f}$$

$V_B$=burnout velocity
$I_{sp}$=specific impulse
$M_i$=initial mass
$M_f$=final mass Elimination of the metal case of the rocket motor reduces $M_f$ and in the extreme limits $V_B$ approaches infinity. Of course $M_f$ cannot be zero when the rocket motor is used as a source of power for a payload but since the payload is small relative to the mass of the total missile $M_i/M_f$ will be a large number. Even though specific performance is adversely affected to some extent by the lower pressures required in the "caseless" rocket, the favorable effect of the large value of $M_i/M_f$ offsets the adverse effect on specific performance and in fact even surpasses it.

Thus, while the use of the rocket motor of the invention in booster rocket applications is one of the presently more important uses of said motor, the invention is not so limited. The rocket motor of the invention can be employed as the sole source of power to deliver a payload, such as a warhead in a military missile. In such instances, the rocket motor would be designed to deliver the payload just prior to burnout. The rocket motor can also be used in multi-stage applications, for example, as a second, third or fourth stage operating at high altitude in a substantial vacuum in which case the specific impulse would not be low. Specific impulse is a function of $P_c/P_o$ ($P_c$=combustion chamber pressure, and $P_o$=ambient pressure) and as $P_o$ approaches a vacuum, $P_c$ does not have to be very high to give a high specific performance. In other words, the rocket motor could be operated at 10, 20 or 30 p.s.i.a., just high enough to obtain good combustion, and the stress on the combustion chamber would be small. $V_B$ of such a rocket can be extremely high. Thus it is within the scope of the invention to fabricate rocket motors capable of withstanding internal combustion chamber pressures ranging from 10 to about 500 p.s.i.a., or higher, depending upon the size of the rocket motor. The propellants described hereinafter are examples of propellants having suitable burning rates for such service, and possess sufficient tensile strength for use in accordance with the invention.

An object of this invention is to provide an improved rocket motor. Another object of this invention is to provide a rocket motor fabricated largely from propellant material. Still another object of this invention is to increase the overall performance efficiency of rocket motors. Still another object of this invention is to provide a "caseless" rocket motor. Other aspects, objects and advantages of the invention will be apparent to those skilled in the art upon reading this disclosure.

Thus according to the invention, there is provided a rocket motor comprising a plurality of concentrically arranged annular layers of propellant material, each of said layers being formed of a plurality of elongated truncated wedges of said propellant material bonded together at their adjoining sides and to wedges of adjoining layers at their inner and outer surfaces to form an assembly, the inner surface of the innermost of said layers being exposed and defining an annulus forming the combustion chamber of said motor; means comprising a plurality of rods extending longitudinally of said assembly for reinforcing and applying longitudinal compression to said assembly; means comprising a plurality of circumferential bands for reinforcing and applying radial compression to said assembly; and an axially disposed exhaust nozzle.

An important feature of the invention are the provisions for providing compression to the assembly of elongated truncated wedges of propellant material from both a longitudinal direction and a radial direction. By using individual wedges of propellant material applicant can build up rocket motors according to the invention of practically any desired size. The means for applying the longitudinal and radial compression make it possible to properly reinforce and hold together large assemblies of individual truncated wedges of propellant material and thus build up the large rocket motors of the invention. The grid work or longitudinal rods and circumferential bands permit the propellant to withstand acceleration forces as well as the internal operating combustion chamber pressures. Said grid work also adds to the fuel by being consumed at the temperatures existing in the rocket motor when the flame front of the burning propellant reaches said rods and bands.

Figure 3:
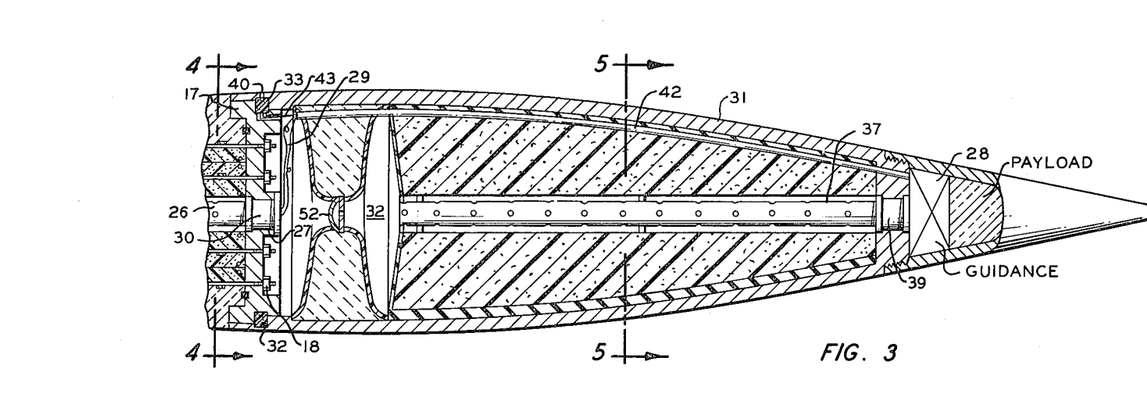
FIGURE 3 is a view, partly in cross-section, of the forward end of the rocket or missile of FIGURE 1.
Figure 4:
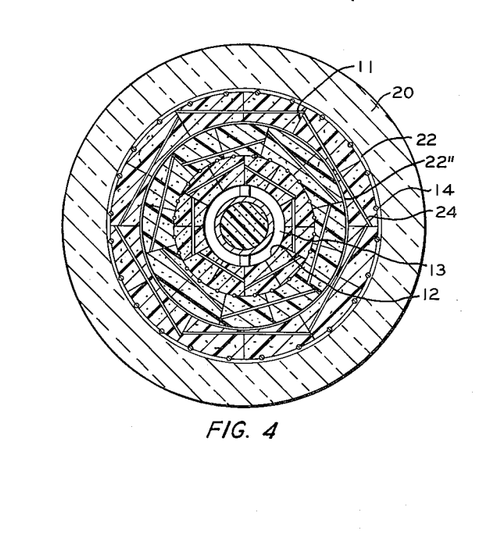
FIGURE 4 is a cross-section along the lines 4—4 of FIGURE 3.
Figure 6:
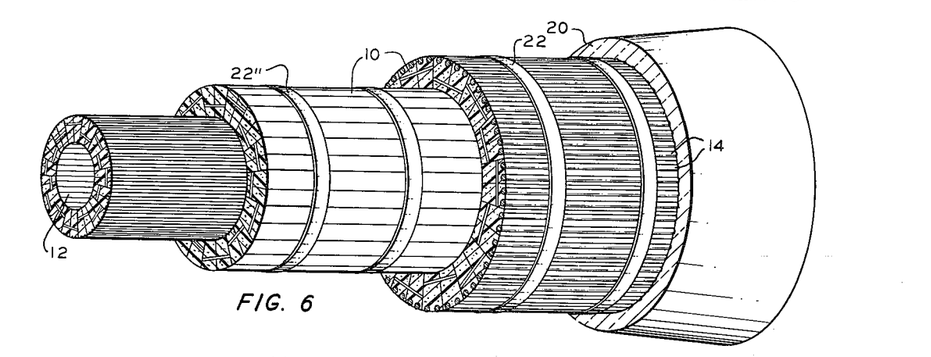
FIGURE 6 is an oblique view of a portion of a rocket motor constructed in accordance with the invention and showing details of the concentrically arranged annular layers of propellant material.
Figure 7:
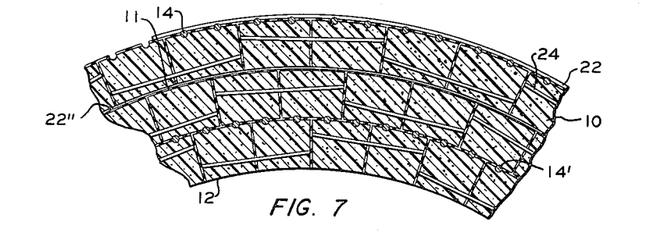
FIGURE 7 is an enlarged view of a cross-section similar to that shown in FIGURE 4 and showing further details of construction of the concentrically arranged annular layers of propellant material.

Referring now to the drawings and particularly to FIGURES 2, 3, 4 and 6, the invention will be more fully explained. As shown, the rocket motor of the invention comprises a plurality of cylindrical, concentrically arranged annular layers of propellant material 10. Each of said layers is formed of a plurality of elongated, truncated wedges of said propellant material bonded together at their adjoining sides and to wedges of adjoining layers at their inner and outer surfaces with a propellant mortar 11, shown more clearly in FIGURE 7. It will be noted that the inner surface 12 of the innermost of said layers is exposed and defines an annulus 13 forming the combustion chamber of the motor. A first plurality of longitudinally disposed reinforcing rods 14 extend along the outer surface of the outermost of said layers of said propellant material 10. A second plurality of longitudinally disposed reinforcing rods 14' extend along the outer surface of the innermost layer of said propellant material and between said innermost layer and the adjacent layer of propellant material. Here, in a preferred embodiment of the invention, said longitudinally extending rods which extend along the outer surface of the outermost layer are mounted in grooves provided in said outer layer as indicated in FIGURES 4 and 7. Similarly, said longitudinally extending rods 14' which are disposed between two adjacent layers of propellant material are preferably mounted in corresponding grooves in said adjacent layers of propellant material. The ends of all of said rods 14 and 14' are threaded as shown and extend beyond the ends of said layers of propellant material and through perforations provided in end plates 16 and 17 (see FIGURE 3). Nuts 18 are provided for each of said rods and when tightened on the extended ends of said rods 14 and 14' compression is applied to the assembly of wedges of propellant material in a longitudinal direction as will be understood by those skilled in the art. Said end plates 16 and 17 are annular and the opening provided in said end plate 16 provides communication between annulus 13 and thread 19 of exhaust nozzle 21 for the combustion gases generated in said annulus 13, i.e., the combustion chamber of the rocket motor. Adapter plate 25 threadedly engages said end plate 16 and nozzle 21, having fins attached thereto as shown, threadedly engages said adapter plate 25.

Figures 1, 2:
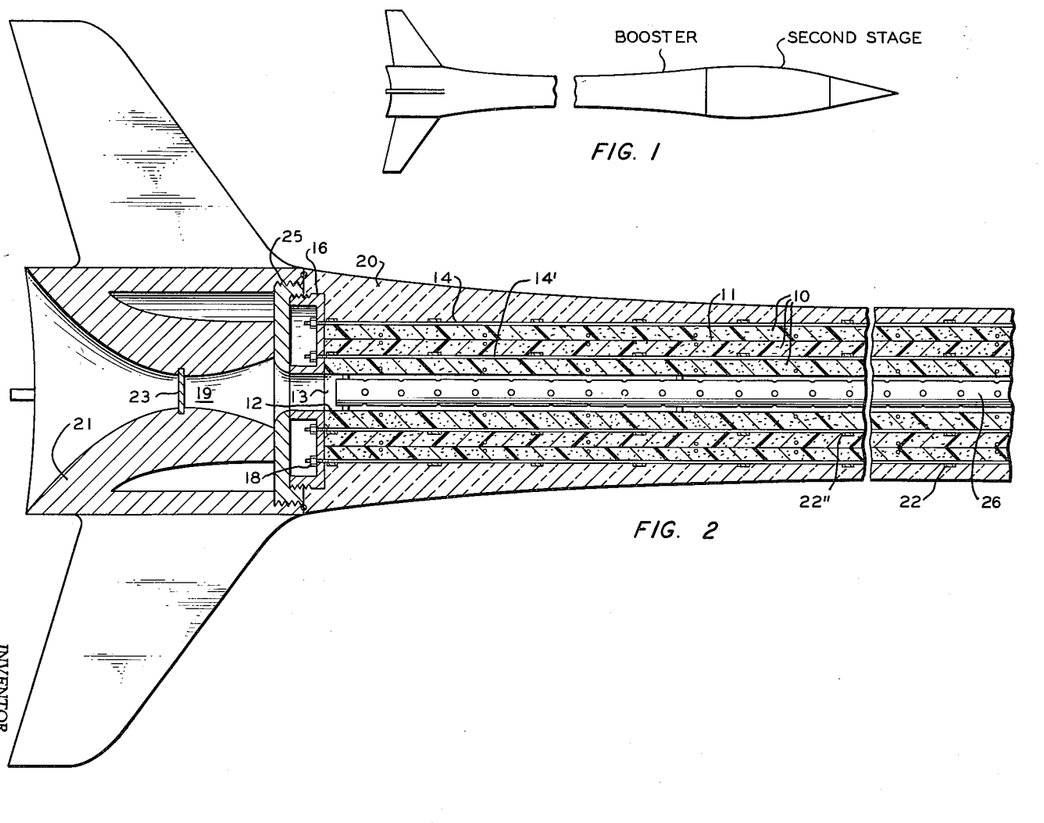
FIGURE 1 is an overall elevation view of a two-stage rocket or missile constructed in accordance with the invention.
FIGURE 2 is a view, partly in cross-section, of the after end of the rocket or missile of FIGURE 1, and shows details of construction of the first or booster stage which is constructed as a "caseless" rocket motor in accordance with the invention.

Referring particuluarly to FIGURE 2, it will be noted that a first plurality of spaced circumferential reinforcing bands 22 surround the outer circumference of the outermost of said layers of propellant material. A second plurality of circumferential reinforcing bands 22" surround the outer circumference of the innermost of said layers of propellant material and is thus between said innermost layer of propellant material and the adjacent layer of propellant material. Said circumferential bands are spaced apart longitudinally the length of the rocket motor. While said second circumferential bands 22" are shown in FIGURE 2 as being placed on alternative layers of propellant material it will be understood that it is within the scope of the invention to apply circumferential bands to all the layers of propellant material or to employ other arrangements of said bands as shown in FIGURE 6 where circumferential bands 22 and 22" are shown on adjacent layers of propellant material.

Referring particularly to FIGURES 4 and 7 it will be noted that adjacent pairs of said truncated wedges of propellant material 12 located in the same layer of propellant material are provided with a transversely extending reinforcing rod 24. Said transversely extending reinforcing rods 24 are not essential in all rocket motors constructed according to the invention. They are particularly useful in large rocket motors constructed according to the invention where they are designed to hold two adjacent wedges of propellant material together so that said adjacent wedges will function substantially as one wedge of material insofar as the radial compression applied by circumferential bands 22 or 22" is concerned.

An igniter means 26 is inserted through the central opening 27 of annular end plate 17 (see FIGURE 3). Said igniter means comprises a perforated tube filled with igniter material and extends into annulus 13, which forms the combustion chamber of the rocket motor, as shown. Said perforated tube is preferably made of a combustible material, such as aluminum metal or a suitable material, which will be consumed during operation of the motor. The igniter material in said perforated tube is ignited by a signal or electric current delivered from guidance system 28 via wires 29 which extend through an insulating refractory plug 30 forming the forward end of said igniter means 26 as shown. Any suitable type of igniter means can be employed in place of that shown. If desired, wires 29 can extend from a source of current other than said guidance system, e.g., a source of current outside the motor.

The truncated wedges of propellant material which are employed to build up the concentrically arranged annular layers of propellant material can be made in any suitable or convenient manner. Said wedges can be extruded, cast, molded, or sawed from blocks of propellant material which has been previously extruded, cast, or molded. After the wedge has been fabricated, if it is desired, grooves can be machined into the surfaces for accommodating the longitudinally extending reinforcing rods. Similarly, holes can be drilled through pairs of said wedges for transversely extending reinforcing rods.

In assembling the rocket motors of the invention the concentrically arranged annular layers 10 of propellant material are built up on a mandrel. Starting with the innermost layer the individual wedges of propellant material are placed around said mandrel and bonded together with the propellant mortar 11 or other bonding agent. The longitudinal reinforcing rods and the circumferential reinforcing bands are placed in position, as described and shown, as the concentric layers of propellant material are built up. After the desired number of layers of propellant material have been built up, the mandrel is removed and end plates 16 and 17 are slipped over the extended ends of the longitudinal reinforcing rods. The nuts 18 on the ends of said longitudinal rods are tightened to impart the desired degree of longitudinal compression and the circumferential reinforcing bands are tightened to impart the desired degree of radial compression. The wedges of propellant material can be formed from either a cured or uncured material. If an uncured material is employed the thus assembled unit can be cured as a unit.

In the manufacture of rocket motors according to this invention, consideration should be given to the internal diameter of the combustion chamber, the outer diameter of the motor, and the length of the motor, because these dimensions are all interrelated. Consideration must also be given to the pressure which will be developed in the combustion chamber (annulus 13) because unless the motor is properly designed, pressure can build up in said combustion chamber and cause the rocket motor to explode. When employing a metal exhaust nozzle of fixed throat dimensions, an excessive increase of pressure within the combustion chamber can be avoided by adjusting the burning rate of the concentrically arranged annular layers of propellant material. This is done by providing layers of successively slower burning propellant material arranged concentrically in an outward direction. Thus, the innermost layer of propellant material would have the fastest burning rate because at this stage of the operation of the motor the combustion chamber (annulus 13) has its smallest diameter, the effective burning surface is smallest, and the amount of combustion gases generated for a propellant of given burning rate will be less than for a larger burning surface or larger internal diameter of the combustion chamber. As the size of annulus 13 increases in diameter due to burning of the innermost layer and succeeding layers of propellant material the effective burning surface increases, more combustion gases are generated, and it is necessary to use a slower burning propellant in order to hold the amount of said gases substantially constant. Thus, the propellant material in said succeeding layers of propellant material will be successively slower in burning rate until at the outermost layer the slowest burning propellant material will be employed. In this manner a substantially constant pressure can be maintained in the combustion chamber during the operation of the motor.

In other embodiments of the invention nozzle 21 can be formed from an erodible metal or from propellant material which will erode or burn away in operation and cause throat 19 to become larger in diameter during the burning of the propellant material. In these embodiments of the invention the burning rate of the concentrically arranged annular layers of propellant material can be the same instead of decreasing successively in an outward direction. In such instances the nozzle must erode or burn away at a proper rate in relation to the burning rate of the propellant material comprising the combustion chamber of the rocket motor so as to compensate for the increased burning surface which becomes available from the increase in diameter of said combustion chamber.

Thus, in the design of rocket motors according to this invention consideration must be given to the thrust time relationship desired, the static pressure in the throat of the nozzle, and the burning rate of the propellant material used in the rocket motor; also, the rate of erosion or burning of the internal nozzle surfaces must be considered when a nozzle of an erodible metal or propellant material is employed.

FIGURES 2 and 3, when combined, illustrate one application of the rocket motor of the invention in a two-stage missile. The second stage rocket motor on said missile comprises a case 31 defining a combustion chamber 32. Said case 31 overlaps forward end plate 17 of the first stage rocket motor of the invention as shown. A keyway is provided in the overlapping portion of said case 31 and said end plate 17. A "key" 33 of any suitable fast burning castable propellant material is placed in said keyway through a plurality of small holes 40 and serves to hold said rocket motor together. It will be understood, of course, that the thrust applied in flight by the first rocket motor also serves to hold said rocket motors together, and therefore the holding action required of the propellant material 33 in said recess is relatively small and serves primarily to insure that the rocket motors are kept in proper alignment prior to actual launching.

Figure 5:
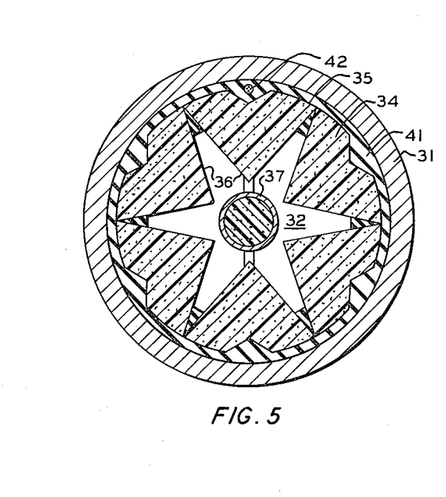
FIGURE 5 is a cross-section along the lines 5—5 of FIGURE 3.

Combustion chamber 32 is filled with a propellant charge as illustrated. Said propellant charge comprises a plurality of wedge-shaped grains 34 (see FIGURE 5) having a restrictor material 35 adhesively applied to their base portions which in turn are adhesively bonded to the inner wall of said case 31. Said grains 34 are aligned so as to form with their exposed surfaces 36, a star-shaped perforation which extends coaxially through combustion chamber 32. Said exposed surfaces 36 serve as the burning surfaces of the propellant material as will be understood by those skilled in the art. An igniter 37, similar to the previously described igniter 26 used in the first stage rocket motor, is disposed in said star-shaped perforation for igniting said propellant grains 34. The igniter material in said igniter 37 can be ignited by signal or electric current delivered from guidance system 28, via wires (not shown) which extend through an insulating refractory plug 39 as shown and are connected into said guidance system 28. It will be noted that the points of said star-shaped perforation are filled with restrictor material. Grains 34 will have a triangular-shaped burning surface, which corresponds roughly with the shape of the grain until it is burned out, and there would normally exist a triangular shaped sliver of propellant which is normally wasted. In order to avoid this, a triangular shaped wedge 41 of restrictor material has been formed in the base portion of each of said propellant grains 34. Conduit 42 extends through one of said triangular-shaped wedges 41 and serves as a conduit for lead wires 29 and 43. Any other suitable arrangement of propellant material can be employed in the second-stage rocket motor.

In FIGURES 1, 2, 3, 8 and 10, the rocket motors or missiles of the invention are shown as having a tapered outer diameter. Thus, the outer diameter of said motors or missiles decreases uniformly from a first point of maximum diameter adjacent the forward end of said motor or missile, through a point of minimum diameter intermediate the ends of said motor or missile, and then increases uniformly from said point of minimum diameter to a second point of maximum diameter adjacent the after end of said motor or missile. This tapered design of the rocket motors or missiles of the invention is not essential in the manufacture of said motors or missiles. It is, however, preferred when the ratio of the length of said motor or missile to the diameter ($L/D$) is greater than 10. When the length/diameter ($L/D$) is less than 10, the surface boundary layer drag along the surface of the rocket or missile can usually be disregarded. However, when the $L/D$ ratio is greater than 10 the amount of said boundary layer drag increases and the tapered outer diameter of the rocket motors or missiles shown is preferred. As shown in FIGURE 2 this taper can be provided by varying the thickness of the restrictor cover 20 which forms the outer layer of the rocket or missile.

The restrictor cover 20 applied to the outer surface of the rocket motor can be any material suitable for the purpose. A presently preferred material for this surface is Teflon or silicone-coated fiberglass wrap. Teflon is polytetrafluoroethylene and is available from E. I. du Pont de Nemours and Company. Cementable Teflon tapes in fibrous glass cloth reinforced form are available from Continental-Diamond Fiber Corporation. Woven glass fabric coated with Teflon is available from Shamban Engineering Company. Various types of silicone laminates made from silicone laminating resins and fibrous glass fabric are available from manufacturers such as the Smedlow Plastics Company, The Formica Company and others. Various other types of glass reinforced plastics in mats, rovings, yarns, or woven goods are available commercially. Plastics and resins used in the preparation of such materials, in addition to Teflon and silicones mentioned above, include melamine resins, polyester resins, epoxy resins, phenolic resins and others. Said restrictor covering can be applied in any convenient manner as by wrapping, layers or mats adhesively bonded to the outer layer of propellant material, etc.

The adhesive or mortar employed to bond the individual wedges of propellant material together and to bond the concentrically arranged annular layers of propellant material together is a self-combustible material, like the solid propellant itself. The usual rubber based cements are not particularly applicable, generally speaking, since their burning rates are so low that for all intent and purpose they are incombustible and do not possess the desired resiliency. The mortars used in this invention should preferably have burning rates which are approximately the same as the average burning rate of the composite propellant charge, or for a more refined charge, the mortar burning rate can be adapted to that of contiguous layers of propellant material. These mortars preferably comprise a compatible rubber binder, preferably liquid in its uncured state, with a low oxidizer content incorporated therein. The burning rate of said mortars can be adjusted by varying the kind and amount of oxidizer incorporated in the rubber binder. A series of particularly useful rubbery binders are the polysulfide liquid polymers made by the Thiokol Corporation. When these polymers have ammonium perchlorate incorporated therein (which oxidizer has a higher percentage of oxygen than ammonium nitrate), low oxidizer loadings must be utilized as to limit the burning rate to the desired range. These mortar formulations are characterized by their high resiliency due to the nature of the rubbery binder and their relatively low oxidizer content; therefore, when these mortars are employed to bond the individual wedges, the composite propellant charge is less susceptible to the effects of shock and temperature induced forces. After mortar is applied to the individual wedges of propellant desired to be bonded, and the entire charges assembled, the mortar and the propellant can be cured simultaneously at elevated temperatures, e.g., 170–185° F.

As an example, suitable mortar formulations can be prepared from the ingredients listed below. As will be understood by those skilled in the art the proportions of the ingredients can be varied within the ranges shown to give a mortar having the desired burning rate and other properties.

| Ingredient: | Weight percent |
| --- | --- |
| Ammonium perchlorate | 40–80 |
| LP–3[1] | 10–55 |
| p-Quinone dioxime | 1–5 |
| Diphenyl guanidine | 1–3 |
| Sulfur | 1–3 |

[1] A liquid polysulfide polymer available from Thiokol Corporation.

The reinforcing longitudinal rods and circumferential bands are preferably of a combustible material which will burn readily when the web burns through and they are exposed to the flame front in the burning propellant material. Suitable materials for said reinforcing rods and bands include magnesium, aluminum, lithium, and other metals and alloys thereof, and boron.

Any solid propellant material having a suitable burning rate, a suitable specific impulse, and a suitable tensile strength is suitable for manufacturing rocket motors in accordance with my invention. Thus a suitable propellant material would be one having a suitable burning rate at a combustion chamber working pressure as low as 10 pounds per square inch absolute and up to about 500 pounds per square inch absolute, and sufficient tensile strength to withstand a combustion chamber working pressure within the range of 10 to 500 pounds per square inch absolute, or higher, when reinforced according to the invention. The specific impulse will vary according to the requirements of the rocket motor as will be understood by those skilled in the art. A presently preferred propellant material is one comprising an ammonium perchlorate oxidizer compound, and a butadiene-methylvinyl-pyridine copolymer binder component. These ammonium perchlorate propellants have a burning rate of from 0.2 to 2.5 inches per second, a specific impulse of up to about 241 seconds, and suitable mechanical properties. The temperature and pressure sensitivities of these propellants are nominal.

The propellant material utilized in fabricating the rocket grains of this invention can be prepared from a variety of known compounding materials. Particularly useful propellant compositions which can be utilized in the practice of this invention are of the rubbery copolymer-oxidizer type which are plasticized and worked to prepare an extrudable mass at 140 to 190° F. The copolymer can be reinforced with suitable reinforcing agents such as carbon black, silica, and the like. Suitable oxidation inhibitors, wetting agents, modifiers, vulcanizing agents, and accelerators can be added to aid processing and to provide for the curing of the wedges of propellant material at temperatures preferably in the range of 170° to 190° F. In addition to the copolymer binder and other ingredients, the propellant composition comprises an oxidizer and a burning rate catalyst.

While ammonium perchlorate has been set forth as the preferred oxidizer for use in the propellants used in the rocket motor of the invention, other solid inorganic oxidizing salts can be also be used. Thus suitable oxidizers include the ammonium and alkali metal salts of nitric and perchloric acids. For example, ammonium nitrate is another preferred oxidizer. The burning rate of the propellant can be varied by varying the kind and amount of the oxidizer and the kind and amount of burning rate catalyst.

The solid propellant compositions particularly useful in the preparation of the propellants used in this invention can be prepared by mixing the copolymer with the solid oxidizer, a burning rate catalyst, and various other compounding ingredients so that the reinforced binder forms a continuous phase and the oxidizer a discontinuous phase. The resulting mixture can be heated to effect curing of the same.

Said copolymers are preferably formed by copolymerization of a vinyl heterocyclic nitrogen compound with an open chain conjugated diene. The conjugated dienes employed are those containing 4 to 6 carbon atoms per molecule and representatively include 1,3-butadiene, isoprene, 2,3-dimethyl-1,3-butadiene, and the like. The vinyl heterocyclic nitrogen compound generally preferred is a monovinylpyridine or alkyl-substituted monovinylpyridine such as 2-vinylpyridine, 3-vinylpyridine, 4-vinylpyridine, 2-methyl-5-vinylpyridine, 5-ethyl-2-vinylpyridine, 2,4-dimethyl-6-vinylpyridine, and the like. The corresponding compounds in which an alpha-methylvinyl (isopropyenyl) groups replaces the vinyl group are also applicable. Thus, suitable heterocyclic nitrogen compounds are the substituted heterocyclic nitrogen bases selected from the group consisting of pyridine, quinoline, and alkyl substituted pyridine and alkyl substituted quinoline, wherein the total number of carbon atoms in the nuclear alkyl substituents is not more than 15 and wherein R is selected from the group consisting of a hydrogen atom and a methyl radical.

In the preparation of the copolymers, the amount of conjugated diene employed is in the range between 75 and 95 parts by weight per 100 parts monomers and the amount of vinyl heterocyclic nitrogen compound is in the range between 25 and 5 parts. Terpolymers are applicable as well as copolymers and in the preparation of the former up to 50 weight percent of the conjugated diene can be replaced with another polymerizable compound such as styrene, acrylonitrile, and the like. Instead of employing a single conjugated diene compound, a mixture of conjugated dienes can be employed. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10-40, preferably in the range of 15 to 25, and may be master-batched with 5-20 parts of Philblack A, a furnace block, per 100 parts of rubber. Masterbatching refers to the method of adding carbon black to the latex before coagulation and coagulating to form a high degree of dispersion of the carbon black in the rubber. In order to facilitate dispersion of the carbon black in the latex, Marasperse-CB, or smiliar surface active agent, can be added to the carbon black slurry or to the water used to prepare the slurry.

The following empirical formulation or recipe generally represents one class of propellant compositions preferred for the preparation of the propellant wedges of this invention.

TABLE I

| Ingredient | Parts per 100 parts of rubber | Parts by weight |
|---|---|---|
| Binder | | 10-25 |
| Copolymer (Bd/MVP) | 100 | |
| Philblack A (a furnace black) | 10-30 | |
| Plasticizer | 10-30 | |
| Silica | 0-20 | |
| Metal oxide | 0-5 | |
| Antioxidant | 0-5 | |
| Wetting agent | 0-2 | |
| Accelerator | 0-2 | |
| Sulfur | 0-2 | |
| Oxidizer | | 75-90 |
| Burning rate catalyst | | 0-30 |

Suitable plasticizers useful in preparing these propellants include TP-90-B (dibutoxyethoxyethyl formal supplied by Thiokol Corporation); benzophenone; and Pentaryl A (monoamylbiphenyl). Suitable silica preparations include a 10-20 micron size range supplied by Davison Chemical Company; and Hi-Sil 202, a rubber grade material supplied by Columia-Southern Chemical Corporation. A suitable anti-oxidant is Flexamine, a physical mixture containing 65 percent of a complex diarylamine-ketone reaction product and 35 percent of N,N'-diphenyl-p-phenylenediamine, supplied by Naugatuck Chemical Corporation. A suitable wetting agent is Aerosol-OT (dioctyl sodium sulfosuccinate), supplied by American Cyanamid Company. Satisfactory rubber cure accelerators include Philcure 113 (SA-113), N,N-dimethyl-S-tertiary butylsulfenyl dithiocarbamate; Butyl-8 (a dithiocarbamate-type rubber accelerator) supplied by R. T. Vanderbilt Company; and GMF (quinone dioxime), supplied by Naugatuck Chemical Company. Suitable metal oxides includes zinc oxide, magnesium oxide, iron oxide, chromium oxide, or combinations of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like. Other burning rate catalysts such as ammonium dichromate, potassium dichromate, sodium dichromate, ammonium molybdate, and the like, can also be used.

An example, of a suitable propellant composition is as follows:

*Composition of propellant in parts per hundred parts of base propellant*

| | |
|---|---|
| Binder component | 18 |
| Oxidizer component | 82 |
| Particle size, microns | 8 |
| Catalyst: | |
| Ammonium dichromate | 4.0 |
| Milori Blue | 2.0 |

Base propellant is defined as binder component plus oxidizer component.

The binder component in this propellant comprises a 90/10 copolymer of butadiene and 2-methyl-5-vinylpyridine with reinforcing agent, plasticizer and curative. The composition of said binder in parts per hundred parts of copolymer is as follows:

| | |
|---|---|
| Copolymer | 100 |
| Philblack A (phr.) | 20 |
| TP-90B (phr.) | 20 |
| Flexamine (phr.) | 3.0 |
| Magnesium oxide (phr.) | 0.5 |

One specific example of a presently preferred propellant composition is as follows.

| Ingredient | Parts per 100 parts of rubber | Total Parts by weight |
|---|---|---|
| Binder | | 13 |
| Copolymer (90/10 Bd/MVP) | 100 | |
| Carbon Black | 22 | |
| Flexamine | 3 | |
| ZP-211 | 20 | |
| Sulfur | 1.75 | |
| Butyl Eight | 2.0 | |
| Zinc oxide | 3.0 | |
| Oxidizer (ammonium perchlorate) | | 87 |
| Burning rate catalyst: | | |
| Ammonium dichromate | | 4.0 |
| Milori Blue | | 2.0 |

By varying the oxidizer content and/or the burning rate catalyst content propellants having varying burning rates for the different layers can be produced.

Said propellant is preferably cured at 190° F. for 48 to 96 hours to impart the desired mechanical properties thereto.

While the preferred binder component has been described as comprising a Bd/MVP copolymer other rubbery materials can be used in the binder component. Any suitable rubbery material including natural rubber, and other synthetic rubbers such as copolymers of butadiene and styrene (GR–S), polybutadiene, etc., can be used. Thus, the binder component can comprise any suitable rubbery material together with the desired compounding ingredients.

Castable propellant material can also be used to fabricate the nozzle and combustion chamber portions of the rocket motor. For example, the polyurethane type propellants such as:

|  | Percent by weight | Parts per 100 parts of propellant |
|---|---|---|
| Binder: |  |  |
| Castor Oil | 37.9 |  |
| Flexrecin-15[1] | 37.0 |  |
| TDI[2] | 25.1 |  |
|  | 100.0 | 21 |
| Oxidizer: |  |  |
| Ammonium perchlorate— |  |  |
| 290 micron-weight average particle size | 55.3 | 79 |
| 14–18 micron-weight average particle size | 23.7 |  |

[1] A ricinoleic acid ester of castor oil. Available from the Baker Castor Oil Company.
[2] Tolylene diisocyanate.

In operation, for example in the operation of the missile illustrated in FIGURES 2 and 3, said missile is placed on a suitable launching platform and the propellant charge in the first stage rocket motor comprising a plurality of cylindrical, concentrically annular layers of propellant material in accordance with the invention, is ignited by means of igniter 26 responsive to a signal or electric current transmitted via wires 29 from guidance system 28 or from a source outside the missile not shown. The missile is thereupon launched. After a predetermined time, and when the propellant charge in the first stage rocket motor is substantially consumed, but before it has been consumed to the extent that the tensile strength of the walls of the combustion chamber is exceeded, the propellant in recess 33 is ignited by an electric current from a source of power (such as a battery, not shown) in guidance system 28 and transmitted to said propellant via wires 43. As explained hereinafter, said guidance system 28 can be of a type to determine ignition of said propellant in recess 33 within itself, or said guidance system 28 can, upon signal from the launching base, furnish the power for igniting said propellant in said recess 33. Upon ignition, said propellant in recess 33 burns and leaves the two rocket motors of the missile free to separate upon development of thrust by the second stage rocket motor. At a predetermined interval after the propellant in said recess 33 has been ignited, an electric current from guidance system 28 transmitted via wires 38 causes igniter 37 to ignite and ignite the propellant charge in the second stage rocket motor. Upon development of sufficient pressure in combustion chamber 32, the starter disc 52 in the nozzle of said second stage rocket motor is ruptured and the pressure developed is applied against forward end plate 17 of the first stage or booster rocket motor and serves to disengage the second stage rocket motor therefrom. The second stage rocket motor is now in the sustained phase of its flight and continues on path to its prearranged target under control of guidance system 28. The unburned propellant in the first stage rocket motor continues to burn, and when the combustion chamber walls have been reduced in thickness to the point that the internal pressure exceeds the tensile strength of said walls, said first stage motor disintegrates. Thus only relatively small pieces are left to fall to the earth. If the nozzle portion has also been fabricated of propellant substantially all of the rocket motor will burn because particles of unburned propellant remaining after disintegration will burn before striking the surface of the earth.

Said guidance means or system 28, per se, forms no part of this invention and can be any suitable type of a conventional guidance system. The type of guidance means employed will depend upon the design and requirements of the missile and the propulsion systems employed therein as will be understood by those skilled in the art. There are three general types of guidance systems. One is a passive system, often called the Command System, in which the rocket or missile carries very little guidance equipment. The radars and computers, i.e., the nervous system, are all on the ground or in a control airplane. They identify and track both target and missile by means of radars and other tracking devices, log the courses of each, and issue instructions to the rocket or missile itself. In a second type, often called the Active Guidance System, almost all the equipment for locating the position of the missile or rocket, and for terminal guidance, are located within the frame of the missile or rocket. A third type, the Semi-Active Guidance System, falls in between the two previously described types.

Figure 8:
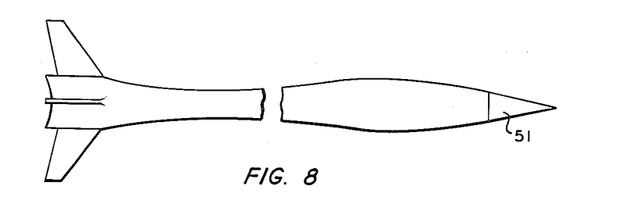
FIGURE 8 is an elevation view of a one-stage rocket or missile constructed in accordance with the invention.

While the invention has been described as employing the rocket motor of the invention in combination with a second stage rocket motor as illustrated in FIGURES 2 and 3 combined, the invention is not so limited. For example, FIGURE 8 illustrates a one-stage rocket or missile wherein the rocket motor of the invention is the only rocket motor in the missile. In this embodiment nose cone 51 replaces the second stage rocket motor of FIGURE 3. Said nose cone 51 is attached to the forward end of the rocket motor of the invention by means of an annular end plate having threads that are similar to the annular end plate 16 employed at the after end of the rocket motor of FIGURE 2. Attached to said threaded annular end plate is a threaded adapter plate, not shown but similar to the adapter plate 16 employed at after end of said rocket motor of FIGURE 2, and then attached to said threaded adapter plate is the nose cone 51.

Figure 9:
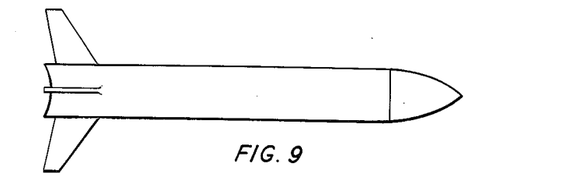
FIGURE 9 is an elevation view of another one-stage rocket or missile constructed in accordance with the invention.
Figure 10:
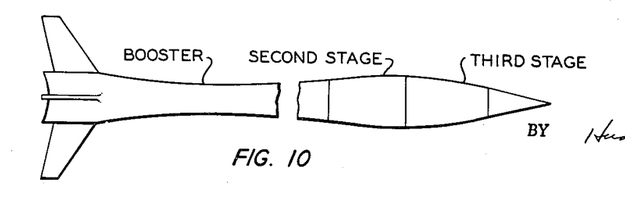
FIGURE 10 is an elevation view of a three-stage rocket or missile constructed in accordance with the invention.

FIGURE 9 illustrates an embodiment of the invention wherein the outer diameter of the rocket motor is not tapered. It should also be understood that the rocket motor of the invention can be employed in missiles having more than two stages such as the missile illustrated in FIGURE 10. Also, in these multistage missiles, it is within the scope of the invention for more than the booster stage rocket motor to be constructed in accordance with the invention. For example, both the second and third stages of the missile of FIGURE 10 could be constructed in accordance with the invention and connected together by suitable connecting means.

Various other modifications of the invention will be apparent to those skilled in the art in view of the above disclosure. Such modifications are believed to be within the spirit and scope of the invention.

I claim:

1. A rocket motor comprising: a plurality of concentrically arranged annular layers of propellant material, each of said layers being formed of a plurality of elongated truncated wedges of said propellant material bonded together at their adjoining sides and to wedges of adjoining layers at their inner and outer surfaces with a propellant mortar to form an assembly with the inner surface of the innermost of said layers being exposed and defining an annulus forming the combustion chamber of said motor; means comprising a plurality of longitudinally disposed reinforcing rods mounted along the outer surface of at least one of said layers for reinforcing and applying longitudinal compression to said assembly; means comprising a plurality of circumferential reinforcing bands surrounding the outer circumference of the outermost of said layers for reinforcing and applying radial compression to said assembly; a plurality of transverse reinforcing rods, each of said rods extending transversely of a pair of said wedges adjacent each other in the same layer of propellant material; igniter means mounted in said annulus; an axially disposed exhaust nozzle; and a layer of restrictor material covering said outermost layer to form the outer skin of said motor.

2. A rocket motor comprising: a plurality of cylindrical concentrically arranged annular layers of propellant material, each of said layers being formed of a plurality of elongated truncated wedges of said propellant material bonded together at their adjoining sides and to wedges of adjoining layers at their inner and outer surfaces with a propellant mortar, the inner surface of the innermost of said layers being exposed and defining an annulus forming the combustion chamber of said motor; a first annular end plate and a second annular end plate mounted as described hereinafter at opposite ends of said assembled layers of propellant material; a first plurality of longitudinally disposed reinforcing rods mounted in grooves provided in the outer surface of the outermost of said layers; at least one other plurality of longitudinally disposed reinforcing rods mounted between and in corresponding grooves provided in adjacent surfaces of an adjoining pair of said layers of said propellant material; the ends of all said rods being threaded and extending beyond the ends of said layers of propellant material and through perforations provided in said end plates; nuts for holding said end plates adjacent the ends of said layers of propellant material; an adapter plate having a central perforation therein and attached to one of said end plates; an exhaust nozzle attached to said adapter plate; igniter means mounted in the other of said end plates and extending into said annulus; a first plurality of circumferential reinforcing bands surrounding the outer circumference of the outermost of said layers; at least one other plurality of circumferential reinforcing bands surrounding the outer circumference of another of said layers; and a layer of restrictor material covering the outer surface of said outermost layer.

3. A rocket motor according to claim 2 wherein: the ratio of the length of said motor to the outer diameter of said motor is greater than 10; and said outer diameter decreases uniformly from a fixed point of maximum diameter adjacent the forward end of said motor, through a point of minimum diameter intermediate the ends of said motor, and then increases uniformly from said point of minimum diameter to a second point of said maximum diameter adjacent the after end of said motor.

4. A rocket motor comprising: a plurality of concentrically arranged annular layers of propellant material, each of said layers being formed of a plurality of elongated truncated wedges of said propellant material bonded together at their adjoining sides and to wedges of adjoining layers at their inner and outer surfaces with a propellant mortar to form an assembly with the inner surface of the innermost of said layers being exposed and defining an annulus forming the combustion chamber of said motor; means comprising a pair of annular end plates each covering one end of said assembly and a plurality of longitudinally disposed reinforcing rods mounted in grooves provided in the outer surface of at least one of said layers for reinforcing and applying longitudinal compression to said assembly; means comprising a plurality of circumferential reinforcing bands surrounding the outer circumference of the outermost of said layers for reinforcing and applying radial compression to said assembly; and an axially disposed exhaust nozzle.

5. A rocket motor comprising: a plurality of concentrically arranged annular layers of propellant material, each of said layers being formed of a plurality of elongated truncated wedges of said propellant material bonded together at their adjoining sides and to wedges of adjoining layers at their inner and outer surfaces with a propellant mortar to form an assembly with the inner surface of the innermost of said layers being exposed and defining an annulus forming the combustion chamber of said motor; means comprising a plurality of longitudinally disposed reinforcing rods mounted in grooves provided in the outer surface of at least one of said layers for reinforcing and applying longitudinal compression to said assembly; means comprising a plurality of circumferential reinforcing bands surrounding the outer circumference of the outermost of said layers for reinforcing and applying radial compression to said assembly; a plurality of transverse reinforcing rods, each of said rods extending transversely through a pair of said wedges which are adjacent each other in the same layer of propellant material; and an axially disposed exhaust nozzle.

6. A rocket motor comprising: a plurality of concentrically arranged annular layers of propellant material, each of said layers being formed of a plurality of elongated truncated wedges of said propellant material bonded together at their adjoining sides and to wedges of adjoining layers at their inner and outer surfaces with a propellant mortar to form an assembly with the inner surface of the innermost of said layers being exposed and defining an annulus forming the combustion chamber of said motor; said assembly being under longitudinal compression provided by means comprising a pair of annular end plates each covering one end of said assembly and a plurality of longitudinally disposed reinforcing rods mounted along the outer surface of at least one of said layers; said assembly also being under radial compression provided by a plurality of circumferential reinforcing bands surrounding the outer circumference of the outermost of said layers; and an axially disposed exhaust nozzle.

7. A rocket motor according to claim 6 wherein each wedge of propellant material in at least one of said layers has at least one of said longitudinally disposed rods mounted in a groove extending across the outer surface thereof.

8. A rocket motor according to claim 7 wherein said assembly also includes a plurality of transverse reinforcing rods each of which extends transversely of two of said wedges of propellant material which are adjacent each other in the same layer of propellant material.

9. A rocket motor comprising: a plurality of concentrically arranged annular layers of propellant material, each of said layers being formed of a plurality of elongated truncated wedges of said propellant material bonded together at their adjoining sides and to wedges of adjoining layers at their inner and outer surfaces with a propellant mortar to form an assembly with the inner surface of the innermost of said layers being exposed and defining an annulus forming the combustion chamber of said motor; means comprising a pair of annular end plates each covering one end of said assembly and a plurality of longitudinally disposed reinforcing rods mounted along the outer surface of at least one of said layers for reinforcing and applying longitudinal compression to said assembly; means comprising a plurality of circumferential reinforcing bands surrounding the outer circumference of the outermost of said layers for reinforcing and applying radial compression to said assembly; an axially disposed exhaust nozzle; and a layer of restrictor material covering said outermost layer to form the outer skin of said motor, the outer diameter of said motor decreasing uniformly from a first point of maximum diameter adjacent the forward end of said motor, through a point of minimum diameter intermediate the ends of said motor, and then increasing uniformly from said point of minimum diameter to a second point of said maximum diameter adjacent the after end of said motor.

References Cited in the file of this patent

UNITED STATES PATENTS

| | | |
|---|---|---|
| 677,527 | Maxim | July 2, 1901 |
| 1,102,653 | Goddard | July 7, 1914 |
| 1,530,692 | Paulus | Mar. 24, 1925 |
| 2,446,560 | Skinner | Aug. 10, 1948 |
| 2,487,053 | Hickman | Nov. 8, 1949 |
| 2,804,823 | Jablansky | Sept. 3, 1957 |
| 2,816,418 | Loedding | Dec. 17, 1957 |
| 2,853,946 | Loedding | Sept. 30, 1958 |

FOREIGN PATENTS

| | | |
|---|---|---|
| 26,430 | Great Britain | July 2, 1908 |
| 543,739 | Great Britain | Mar. 11, 1942 |